US011977347B2

(12) United States Patent
Okuzono

(10) Patent No.: US 11,977,347 B2
(45) Date of Patent: May 7, 2024

(54) IMAGE FORMING APPARATUS, METHOD FOR CONTROLLING IMAGE FORMING APPARATUS, AND STORAGE MEDIUM

(71) Applicant: CANON KABUSHIKI KAISHA, Tokyo (JP)

(72) Inventor: Ryotaro Okuzono, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/738,954

(22) Filed: May 6, 2022

(65) Prior Publication Data

US 2022/0260946 A1 Aug. 18, 2022

Related U.S. Application Data

(63) Continuation of application No. 16/931,269, filed on Jul. 16, 2020, now Pat. No. 11,347,171, which is a continuation of application No. 16/405,757, filed on May 7, 2019, now Pat. No. 10,962,912, which is a continuation of application No. 15/218,864, filed on Jul. 25, 2016, now Pat. No. 10,310,425, which is a continuation of application No. 14/863,230, filed on Sep. 23, 2015, now Pat. No. 9,459,576, which is a continuation of application No. 14/308,062, filed on Jun. 18, 2014, now Pat. No. 9,170,539.

(30) Foreign Application Priority Data

Jun. 21, 2013 (JP) ................................ 2013-130608

(51) Int. Cl.
*G03G 15/00* (2006.01)

(52) U.S. Cl.
CPC ..... *G03G 15/5004* (2013.01); *G03G 15/5091* (2013.01)

(58) Field of Classification Search
None
See application file for complete search history.

(56) References Cited

U.S. PATENT DOCUMENTS 11,347,171 B2 * 5/2022 Okuzono ........... G03G 15/5091
2006/0029412 A1 2/2006 Kato
2009/0158152 A1 * 6/2009 Kodimer ................ G06F 9/453 715/708

(Continued)

FOREIGN PATENT DOCUMENTS

JP 2010160609 A 7/2010

*Primary Examiner* — Jas A Sanghera
(74) *Attorney, Agent, or Firm* — CANON U.S.A., INC. IP Division

(57) ABSTRACT

An image forming apparatus includes a detection unit configured to detect an object and a power-supply control unit. The power-supply control unit shifts the image forming apparatus to a second power state, in response to a lapse of a predetermined time following no detection of the object, when a job has not been executed until the detection unit detects no object, after the power-supply control unit shifts the image forming apparatus to the first power state. The power-supply control unit shifts the image forming apparatus to the second power state before a lapse of the predetermined time, when a job has been executed until the detection unit detects no object, after the power-supply control unit shifts the image forming apparatus to the first power state.

39 Claims, 7 Drawing Sheets

(56) References Cited

U.S. PATENT DOCUMENTS

| | | | |
|---|---|---|---|
| 2012/0137154 | A1 | 5/2012 | Azuma |
| 2012/0204046 | A1 | 8/2012 | Baba |
| 2013/0151873 | A1 | 6/2013 | Higashi |

* cited by examiner

IMAGE FORMING APPARATUS, METHOD FOR CONTROLLING IMAGE FORMING APPARATUS, AND STORAGE MEDIUM

CROSS-REFERENCE TO RELATED APPLICATION

This application a Continuation of U.S. application Ser. No. 16/931,269, filed Jul. 16, 2020; which is a Continuation of U.S. application Ser. No. 16/405,757, filed May 7, 2019, now U.S. patent Ser. No. 10/962,912, issued Mar. 30, 2021; which is a Continuation of U.S. application Ser. No. 15/218,864 filed Jul. 25, 2016, now U.S. patent Ser. No. 10/310,425, issued Jun. 4, 2019; which is a Continuation of U.S. application Ser. No. 14/863,230 filed Sep. 23, 2015, now U.S. Pat. No. 9,459,576 issued Oct. 4, 2016; which is a Continuation of U.S. application Ser. No. 14/308,062 filed Jun. 18, 2014, now U.S. Pat. No. 9,170,539 issued Oct. 27, 2015, which claims priority from Japanese Patent Application No. 2013-130608 filed Jun. 21, 2013, which are hereby incorporated by reference herein in their entireties.

BACKGROUND OF THE INVENTION

Field of the Invention

The present invention relates to an image forming apparatus using a human detection technique, and particularly relates to an image forming apparatus that changes a power state by using the human detection technique. The present invention also relates to a method for controlling such image forming apparatus, and a storage medium.

Description of the Related Art

Conventionally, in an image forming apparatus such as a printer, a facsimile machine, and a copying machine, predetermined power generated in a power supply device is supplied to a predetermined load of the image forming apparatus. The image forming apparatus includes a power-supply control device. The power-supply control device causes a shift from a normal mode to a power-saving mode, when the image forming apparatus has not operated for a predetermined time. In the power-saving mode, power consumption is smaller than power consumption in the normal mode. However, it is necessary to maintain the normal mode for a predetermined time even after completion of an operation by a user, until the shift to the power-saving mode is completed. Therefore, unnecessary power may be consumed.

A method of trying to address this issue is to provide the image forming apparatus with a human detection unit, and adjust sensitivity of the human detection unit according to a processing execution operation of the user. Another method is to adjust a count value of a timer used for a shift to the power-saving mode, according to frequency of operating a power-saving mode release unit. There is a technique that attempts to realize compatibility between user convenience and power-consumption reduction, by using those methods (Japanese Patent Application Laid-Open No. 2012-118253).

However, in the above-described technique discussed in Japanese Patent Application Laid-Open No. 2012-118253, it is still necessary to maintain the normal mode for a predetermined time until a shift to the power-saving mode is completed, even after completion of the user operation, while adjustment of sensitivity of the human detection unit and of the count value of the timer is performed. Therefore, in this technique, unnecessary power consumption still exists.

SUMMARY OF THE INVENTION

The present invention is directed to an image forming apparatus capable of suppressing unnecessary power consumption while ensuring convenience of an operator, by switching power control to adapt to movement of the operator moving away from an operation unit.

According to an aspect of the present invention, an image forming apparatus is configured to operate in a first power state and a second power state in which power consumption is smaller than power consumption in the first power state. The image forming apparatus includes a detection unit configured to detect an object present around the image forming apparatus, and a power-supply control unit configured to shift the state of the image forming apparatus from the second power state to the first power state, when the detection unit detects an object present around the image forming apparatus, wherein the power-supply control unit shifts the state of the image forming apparatus from the first power state to the second power state, in response to a lapse of a predetermined time following no detection of the object by the detection unit, when a job has not been executed until the detection unit detects no object, after the power-supply control unit shifts the state of the image forming apparatus to the first power state, and the power-supply control unit shifts the state of the image forming apparatus from the first power state to the second power state before a lapse of the predetermined time, when a job has been executed until the detection unit detects no object, after the power-supply control unit shifts the state of the image forming apparatus to the first power state.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings.

Figure 1:
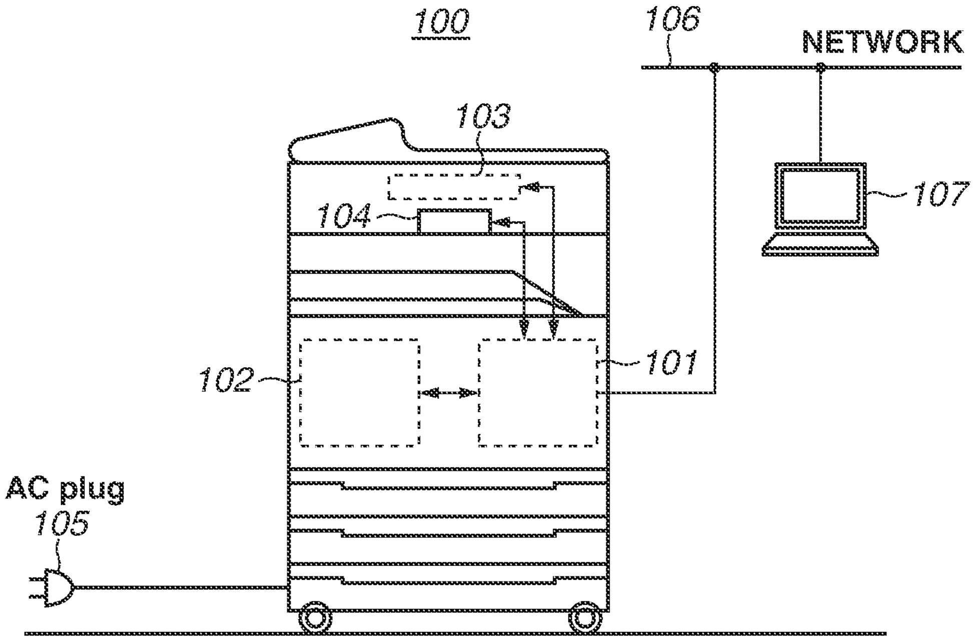
FIG. 1 is a diagram illustrating a configuration of an image forming apparatus.

FIG. 1 is a diagram used to describe a configuration of an image forming apparatus (an image forming apparatus 100) according to a first exemplary embodiment. In the present exemplary embodiment, the image forming apparatus 100 includes a printer unit 102, a scanner unit 103, and a main controller unit 101. It is to be noted that, in the present exemplary embodiment, the image forming apparatus 100 that operates in a first power state and a second power state will be described as an example. In the second power state, power consumption is smaller than power consumption in the first power state.

In FIG. 1, the printer unit 102 performs processing for forming an image on a sheet-like recording medium (a sheet of paper) according to an electrophotographic method, for example. The scanner unit 103 optically reads an image from a document, and converts the read image to a digital image.

The main controller unit 101 controls the entire image forming apparatus 100, and performs control for image processing and a copying operation. The printer unit 102 performs the image processing on the image of the document read by the scanner unit 103. Further, the main controller unit 101 is connected to a personal computer (PC) 107 through a network 106. The network 106 is a network such as a local area network (LAN), and may be either wired or wireless. The PC 107 is a general computer apparatus including a central processing unit (CPU), a random-access memory (RAM), and a fixed storage device such as a hard disk drive (HDD). A monitor, a keyboard, a mouse, and the like are connected to the PC 107. The PC 107 is installed with a printer driver program serving as an image forming program.

When executing the printer driver program, the PC 107 generates page-description language (PDL) data according to a rendering command issued by an operating system or an application program, and transmits the generated PDL data to the image forming apparatus 100. Here, the PDL data is based on a PDL that can be processed by the image forming apparatus 100. The PDL data results from conversion by the printer driver program. The image forming apparatus 100 performs a printing operation. In the printing operation, a bitmapped image is generated based on the PDL data received from the PC 107, and the generated bitmapped image is formed on a sheet.

The image forming apparatus 100 includes an alternating current (AC) plug 105. When the AC plug 105 is inserted into an outlet provided outside the image forming apparatus 100, the image forming apparatus 100 receives power from an AC commercial power source.

Further, the image forming apparatus 100 includes a human detection sensor unit 104 that detects a moving object, such as a human, around the image forming apparatus 100. It is to be noted that the human detection sensor unit 104 is not limited in particular, as far as the human detection sensor unit 104 is a sensor capable of determining the presence or absence of a human in a detection region. Examples of the human detection sensor unit 104 include a pyroelectric sensor and a reflection-type sensor. The pyroelectric sensor senses infrared rays emitted from a human, and determines the presence or absence of the human based on a variation in the infrared rays. The reflection-type sensor emits light such as infrared rays, and detects reflected light of the emitted light. The human detection sensor unit 104 may be a sensor including a plurality of receiving units that receive infrared rays. The plurality of receiving units may be arranged in a grid, or may be linearly arranged.

Figure 2A:
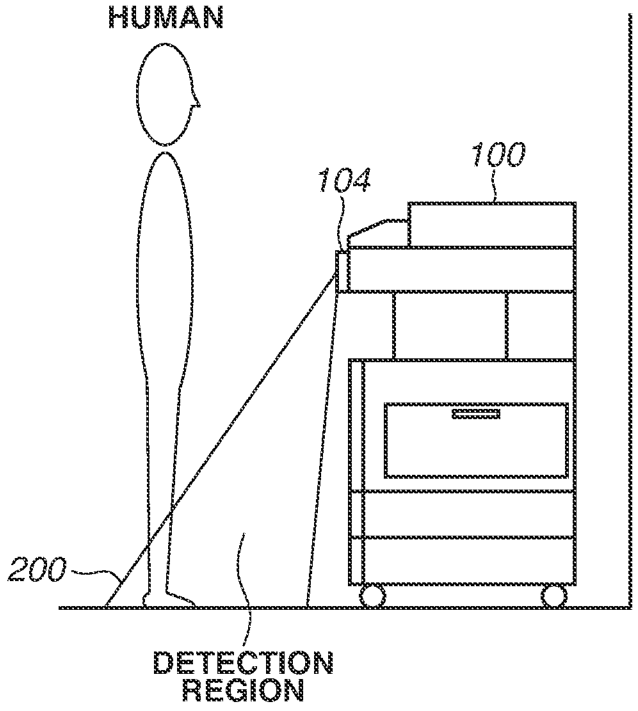
FIGS. 2A and 2B are conceptual diagrams each illustrating a detection region of a human detection sensor unit illustrated in FIG. 1.
Figure 2B:
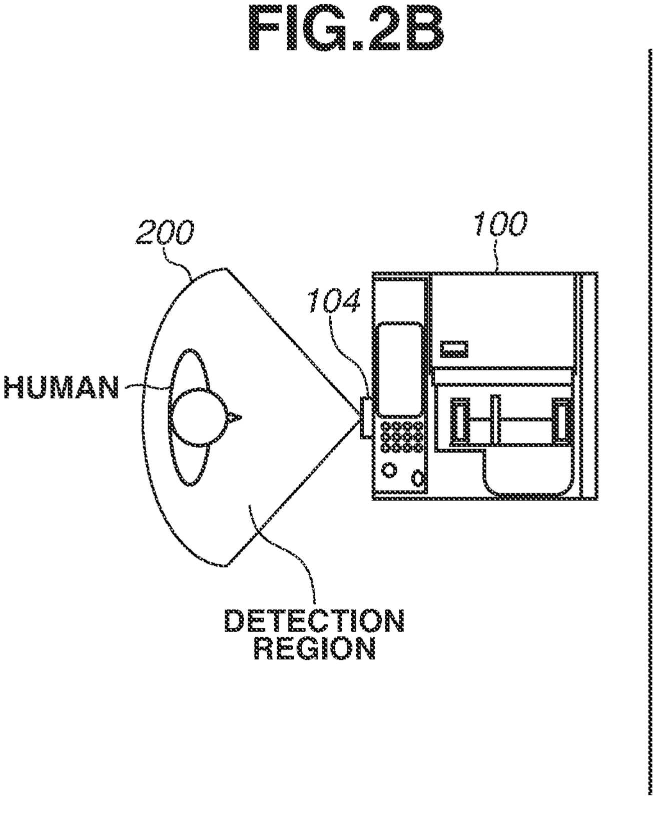

FIGS. 2A and 2B are conceptual diagrams each illustrating a detection region of the human detection sensor unit 104 illustrated in FIG. 1.

In FIGS. 2A and 2B, a detection region 200 is a detection region of the human detection sensor unit 104. The human detection sensor unit 104 detects a human when the human is in the detection region 200. FIG. 2A illustrates a concept when the image forming apparatus 100 is viewed from a side. The detection region 200 of the human detection sensor unit 104 is directed downwards from the image forming apparatus 100 in front of which a user is expected to be present to perform an operation while standing.

Further, FIG. 2B illustrates a concept when the image forming apparatus 100 is viewed from above. The human detection sensor unit 104 is attached to a front face of an operation unit 319, because a human is expected to stand in front of the image forming apparatus 100 and to operate the operation unit while facing this front face. It is to be noted that this detection region 200 can be modified according to factors such as an attachment location of the human detection sensor unit 104 and an orientation at the time of attachment.

Figure 3:
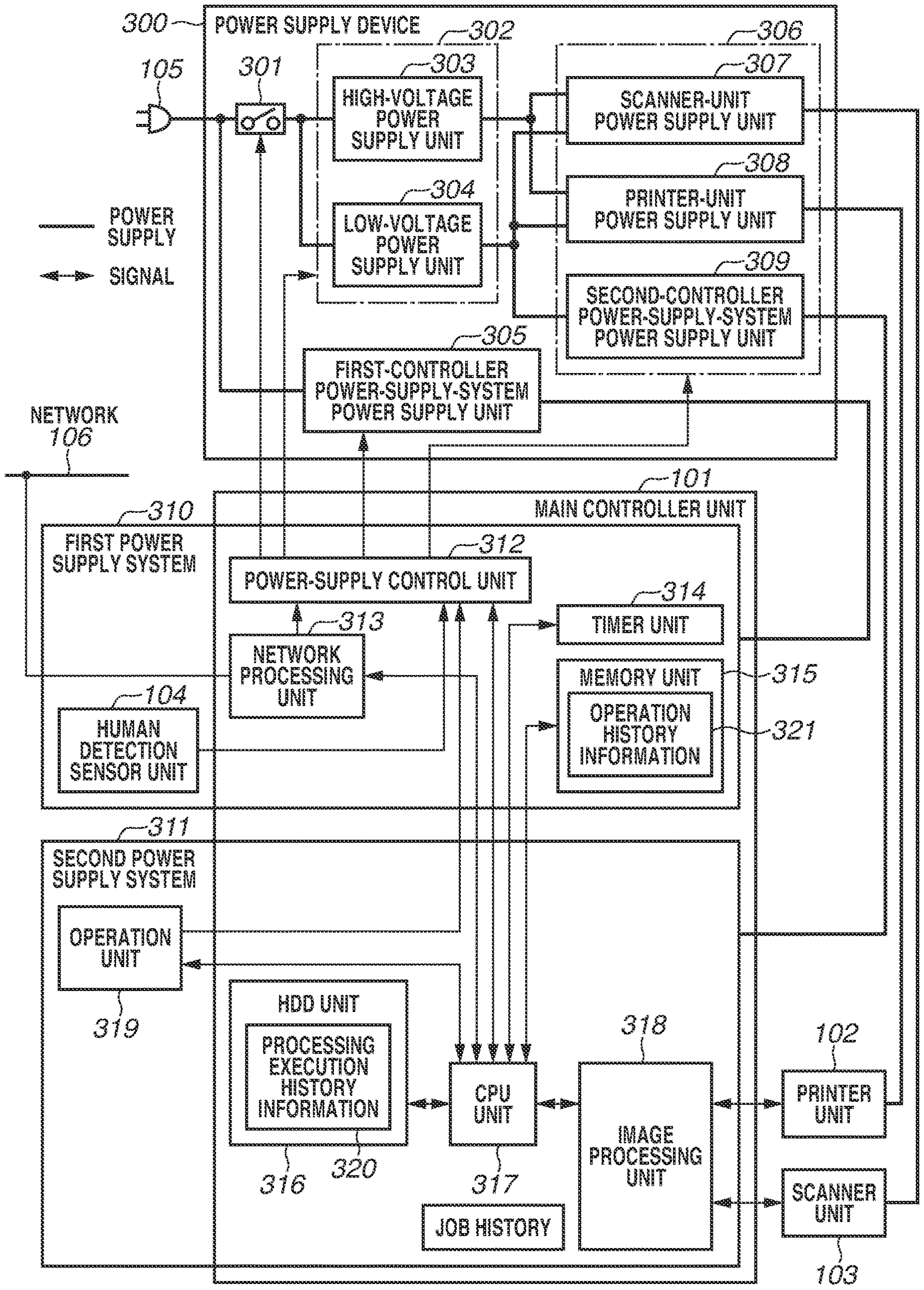
FIG. 3 is a block diagram illustrating a configuration of a main controller unit and a power supply device.

FIG. 3 is a block diagram illustrating a configuration of each of the main controller unit 101 illustrated in FIG. 1 and a power supply device 300.

In FIG. 3, the main controller unit 101 includes a power-supply control unit 312, a network processing unit 313, a timer unit 314, a memory unit 315, an HDD unit 316, a CPU unit 317, and an image processing unit 318.

The power-supply control unit 312 performs switching control for supplying/shutting-off power to each processing unit of the image forming apparatus 100, according to a control program executed by the CPU unit 317 of the main controller unit 101. The switching control also depends on the state of each of the human detection sensor unit 104, an operation unit 319, and the network processing unit 313. The network processing unit 313 is connected to the CPU unit 317 and the power-supply control unit 312. The power-supply control unit 312 is supplied with power, even after the state of the processing unit including the CPU unit 317 shifts to a power-saving state. In this power-saving state, the power-supply control unit 312 performs the switching control for supplying/shutting-off the power to each processing unit of the image forming apparatus 100. Therefore, the power-supply control unit 312 may be configured to include a sub CPU.

The network processing unit 313 functions as a control unit that outputs, to the CPU unit 317, the PDL data transmitted from the PC 107 through the network 106. Further, when the image forming apparatus 100 is in a power-saving mode, the network processing unit 313 instructs the power-supply control unit 312 to shift to a normal mode, upon receipt of a network packet directed to the image forming apparatus 100 from the network 106.

The human detection sensor unit 104 is connected to the power-supply control unit 312, and notifies the power-supply control unit 312 of the presence or absence of a human in the detection region of the human detection sensor unit 104. Further, when the image forming apparatus 100 is in the power-saving mode, the human detection sensor unit 104 instructs the power-supply control unit 312 to shift to the normal mode, upon detecting the presence of a human in the detection region of the human detection sensor unit 104.

The timer unit 314 is connected to the CPU unit 317, and performs processing for clocking a shift time for a shift of the image forming apparatus 100 to the power-saving mode. The memory unit 315 is connected to the CPU unit 317. The memory unit 315 is a volatile memory such as a double data rate synchronous dynamic random-access memory (DDR SDRAM). The memory unit 315 is a main memory that stores data such as user data created by, for example, the control program executed by the CPU unit 317.

Further, the memory unit 315 stores operation history information 321 that indicates when the operation unit 319 was operated. The operation history information 321 is updated by the CPU unit 317, every time the operation unit 319 is operated. The HDD unit 316 is connected to the CPU unit 317. The HDD unit 316 is a storage device that temporarily stores the program executed by the CPU unit 317 and the PDL data transmitted from the network 106.

The HDD unit 316 stores processing execution history information 320. The processing execution history information 320 indicates when a job such as a copying operation, a printing operation, and a scanning operation was executed. The processing execution history information 320 is updated by the CPU unit 317, every time the job is completed.

The CPU unit 317 controls the entire image forming apparatus 100. The CPU unit 317 implements a function such as a copy function and a print function, based on a control program stored in the HDD unit 316. The image processing unit 318 is connected to the CPU unit 317, the printer unit 102, and the scanner unit 103. The image processing unit 318 performs image processing such as color space conversion on a digital image output from the scanner unit 103, and outputs data, as to which the image processing was performed, to the CPU unit 317.

The image processing unit 318 performs image processing such as color space conversion on image data read by the scanner unit 103 or image data generated based on the PDL data received from the PC 107. The image processing unit 318 then converts the image data into bitmap data, and outputs the bitmap data to the printer unit 102. The operation unit 319 is connected to the power-supply control unit 312 and the CPU unit 317. The operation unit 319 includes an operation liquid crystal panel and hard keys including a power-saving mode release button, to accept instructions input by a user. Further, upon detecting a press of the power-saving mode release button when the image forming apparatus 100 is in the power-saving mode, the operation unit 319 instructs the power-supply control unit 312 to perform a shift to the normal mode.

The power supply device 300 of the image forming apparatus 100 illustrated in FIG. 1 will be described with reference to FIG. 3.

When the AC plug 105 of the image forming apparatus 100 is inserted into an outlet provided outside the image forming apparatus 100, a relay 301 and a first-controller power-supply-system power supply unit 305 are supplied with power from the AC commercial power source. The relay 301 is controlled by the power-supply control unit 312. Turning on the relay 301 enables power supply to a high-voltage power supply unit 303 and a low-voltage power supply unit 304. The first-controller power-supply-system power supply unit 305 is controlled by the power-supply control unit 312, and connected to a first power supply system 310 of the main controller unit 101.

The first power supply system 310 is continuously supplied with power even in the power-saving mode. The human detection sensor unit 104, the power-supply control unit 312, the network processing unit 313, the timer unit 314, and the memory unit 315 are connected to the first power supply system 310. A power supply unit 302 including the high-voltage power supply unit 303 and the low-voltage power supply unit 304 is controlled by the power-supply control unit 312. Power supply to the power supply unit 302 is shut off in the power-saving mode. The high-voltage power supply unit 303 is mainly used for, for example, motor driving for the printer unit 102 and the scanner unit 103, as well as a heater of a fixing unit. The low-voltage power supply unit 304 supplies power to the printer unit 102, the scanner unit 103, and a second power supply system 311 of the main controller unit 101. Power supply to the second power supply system 311 of the main controller unit 101 is shut off in the power-saving mode. The HDD unit 316, the CPU unit 317, the image processing unit 318, and the operation unit 319 are connected to the second power supply system 311.

A power supply unit 306 includes, a scanner-unit power supply unit 307, a printer-unit power supply unit 308, and a second-controller power-supply-system power supply unit 309. The power supply unit 306 is controlled by the power-supply control unit 312, and power supply to the power supply unit 306 is shut off in the power-saving mode. The scanner-unit power supply unit 307 is connected to the scanner unit 103, and receives power from the high-voltage power supply unit 303 and the low-voltage power supply unit 304. The scanner-unit power supply unit 307 is controlled to be ON/OFF by the power-supply control unit 312.

The printer-unit power supply unit 308 is connected to the printer unit 102, and receives power from the high-voltage power supply unit 303 and the low-voltage power supply unit 304. The printer-unit power supply unit 308 is controlled to be ON/OFF by the power-supply control unit 312. The second-controller power-supply-system power supply unit 309 is connected to the second power supply system 311 of the main controller unit 101, and receives power from the low-voltage power supply unit 304. The second-controller power-supply-system power supply unit 309 is controlled to be ON/OFF by the power-supply control unit 312.

Figure 4:
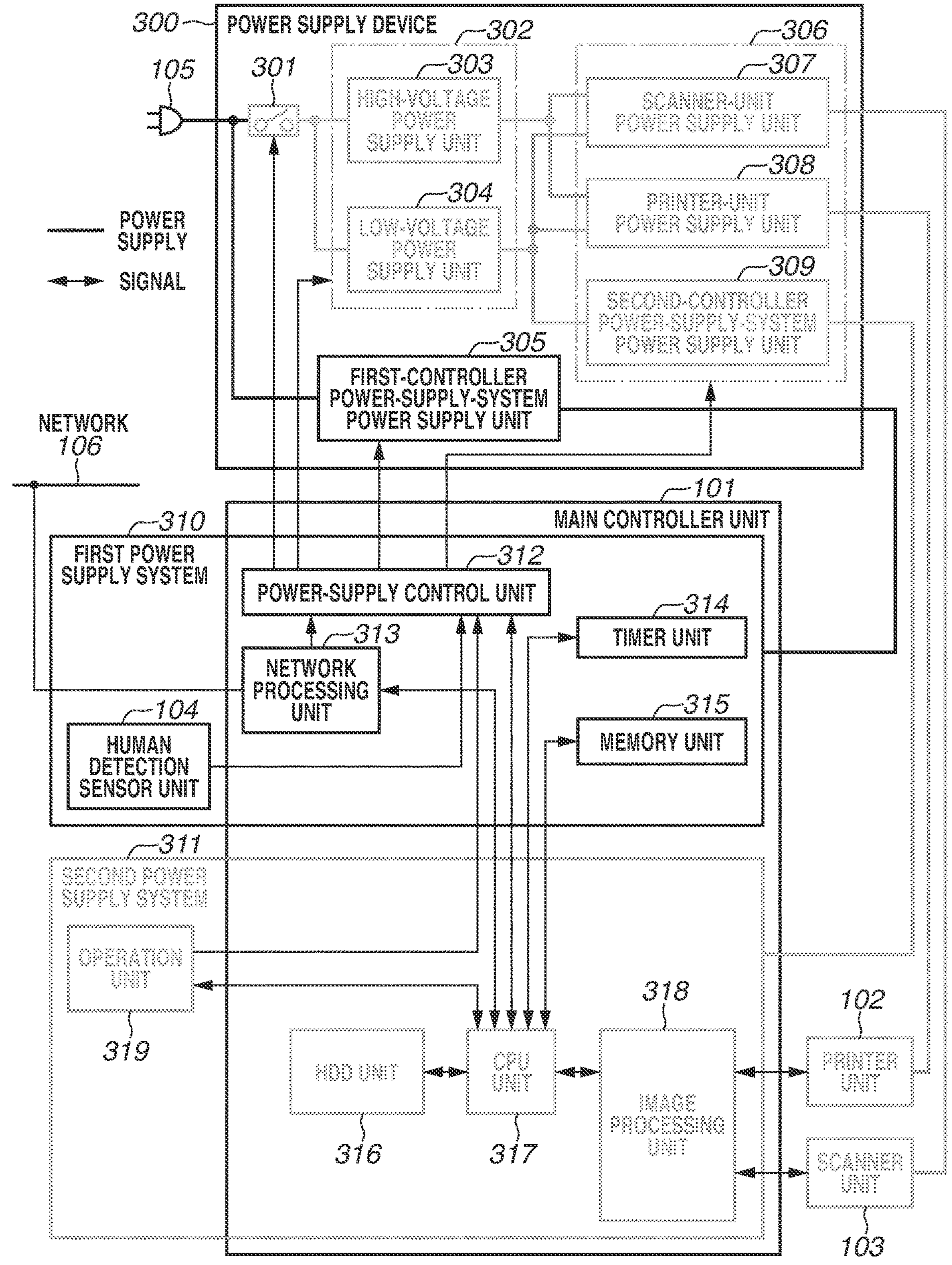
FIG. 4 is a block diagram illustrating a power supply state of the image forming apparatus.

FIG. 4 is a block diagram used to describe a power supply state of the image forming apparatus 100 according to the present exemplary embodiment. In FIG. 4, a grayed part corresponds to a power supply state in the power-saving mode. It is to be noted that, in the normal mode, power is supplied to all blocks as illustrated in FIG. 3. In this state, only a necessary function may be supplied with power, which, however, will not be described here. In the power-saving mode, some of the blocks are supplied with power as illustrated in FIG. 4.

First, the first-controller power-supply-system power supply unit 305 is supplied with power from the AC commercial power source, through the AC plug 105. The first-controller power-supply-system power supply unit 305 supplies power to blocks including the human detection sensor unit 104, the power-supply control unit 312, the network processing unit 313, the timer unit 314, and the memory unit 315. It is to be noted that, although power supply to the operation unit 319 is illustrated to be shut off, the power-supply control unit 312 is allowed to detect a press of the power-saving mode release button.

Next, a sequence of a shift from the normal mode to the power-saving mode will be described.

When a power-saving mode shift condition is satisfied, the CPU unit 317 executes power-saving mode shift processing. The power-saving mode shift condition is, for example, such a condition that any operation with regard to the image forming apparatus 100 has not been performed for a predetermined time. In the power-saving mode shift processing, at first, the CPU unit 317 executes the power-saving mode shift processing for software, such as saving of data of the image processing unit 318, according to the control program stored in the HDD unit 316.

Upon completion of the power-saving mode shift processing for the software, the CPU unit 317 instructs the power-supply control unit 312 to shut off power supply to the relay 301, the power supply unit 302, and the power supply unit 306. Upon receipt of a power shut-off instruction from the CPU unit 317, the power-supply control unit 312 shuts off the power supply to the relay 301, the power supply unit 302, and the power supply unit 306, thereby completing a shift to the power-saving mode in which power consumption is small.

Figure 5:
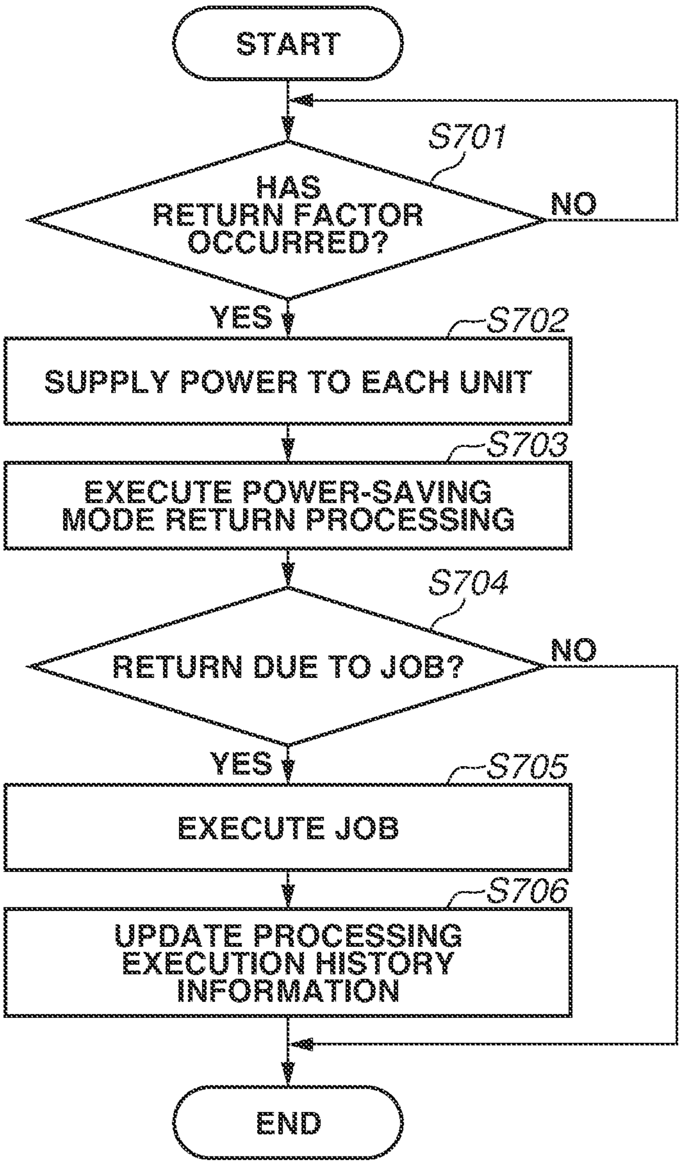
FIG. 5 is a flowchart illustrating a method for controlling the image forming apparatus.

FIG. 5 is a flowchart used to describe a method for controlling the image forming apparatus 100 according to the present exemplary embodiment. This is an example of a power-saving mode return (shift) sequence. It is to be noted that a non-illustrated sub CPU of the power-supply control unit 312 implements each step by loading a control program into a memory and executing the loaded control program. Control of timing for a shift to the normal mode in the present exemplary embodiment will be described below.

First, in step S701, the power-supply control unit 312 checks the state of each of the network processing unit 313, the human detection sensor unit 104, and the power-saving mode release button of the operation unit 319, to determine whether there is an instruction for a shift from the power-saving mode to the normal mode. Upon determining that there is no instruction for a shift to the normal mode (No in step S701), the power-supply control unit 312 regularly polls each unit to check the state thereof, until an instruction for a shift to the normal mode occurs. Upon determining that there is an instruction for a shift to the normal mode (YES in step S701), in step S702, the power-supply control unit 312 turns on the relay 301, the power supply unit 302, and the power supply unit 306, to start power supply to each of these units.

When power is supplied to the CPU unit 317, in step S703, the CPU unit 317 executes power-saving mode return processing. In the power-saving mode return processing, the CPU unit 317 executes the power-saving mode return processing for software such as restoration of data in the image processing unit 318, according to the control program stored in the HDD unit 316 or the memory unit 315.

In step S704, upon completion of the power-saving mode return processing, the CPU unit 317 accesses the power-supply control unit 312 to check a factor of the shift to the normal mode. When the factor of the shift to the normal mode is determined not to be a return due to a job (NO in step S704), the power-supply control unit 312 maintains the normal mode. In step S705, when the power-supply control unit 312 determines that the factor of the shift to the normal mode is a return due to a job such as a printing operation and a copying operation (YES in step S704), the CPU unit 317 executes the job. In step S706, upon completion of the job, the CPU unit 317 updates the processing execution history information 320 stored in the HDD unit 316, which completes the processing.

Figure 6:
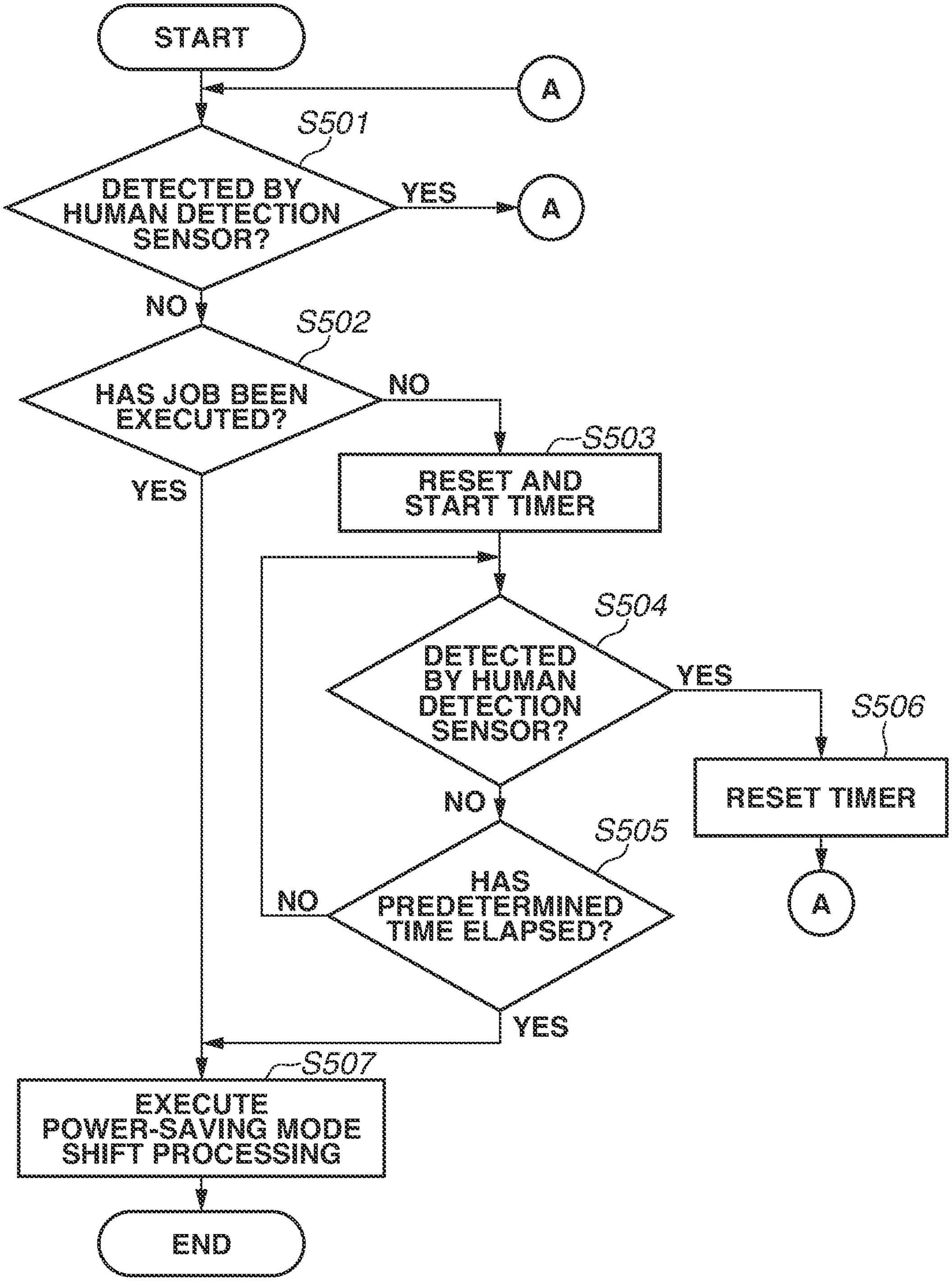
FIG. 6 is a flowchart illustrating a method for controlling the image forming apparatus.

FIG. 6 is a flowchart used to describe the method for controlling the image forming apparatus 100 according to the present exemplary embodiment. This is an example of a power-saving mode return (shift) sequence. It is to be noted that a non-illustrated sub CPU of the power-supply control unit 312 implements each step by loading the control program into the memory and executing the loaded control program. The state of power supply to all processing units is switched to the power-saving state, based on an operation state brought by an operation unit 319 and a job execution state brought by a processing unit. Control of such switching will be described below. In step S501, when the image forming apparatus 100 is in the normal mode after returning from the power-saving mode, the CPU unit 317 checks the state of the human detection sensor unit 104 through the power-supply control unit 312 to determine whether a human is present in front of the image forming apparatus 100.

Upon determining that a human is present in front of the image forming apparatus 100 (YES in step S501), the CPU unit 317 regularly polls the human detection sensor unit 104 until the human detection sensor unit 104 enters a state of not detecting a human. In step S502, upon determining that no human is present in front of the image forming apparatus 100 (NO in step S501), the CPU unit 317 checks the processing execution history information 320 stored in the HDD unit 316. When there is no job execution history in the processing execution history information 320 after the return from the power-saving mode (NO in step S502), the CPU unit 317 determines that the human is temporarily away from the image forming apparatus 100 (the image forming apparatus 100 is in use).

Accordingly, in step S503, the CPU unit 317 resets the timer 314 and sets it at the time to be measured so as to measure a predetermined time. Then the CPU unit 317 starts measurement of the predetermined time by activating the timer unit 314. In step S504, after activating the timer unit 314, the CPU unit 317 checks the state of the human detection sensor unit 104 through the power-supply control unit 312 to determine whether a human is present in front of the image forming apparatus 100 (or the human comes back). Upon determining that a human is present in front of the image forming apparatus 100 (YES in step S504), in step S506, the CPU unit 317 resets the timer unit 314 to cancel the measurement of the predetermined time, and then returns to step S501.

After resetting the timer unit 314, the CPU unit 317 regularly polls the human detection sensor unit 104, until the human detection sensor unit 104 enters a state of not detecting a human. Upon determining that there is no human in front of the image forming apparatus 100 (NO in step S504), in step S505, the CPU unit 317 checks a timer count value of the timer unit 314. When the predetermined time has not elapsed (NO in step S505), the CPU unit 317 checks the state of the human detection sensor unit 104 again.

When the predetermined time has elapsed (YES in step S505), in step S507, the CPU unit 317 executes the power-saving mode shift processing to cause a shift to the power-saving mode in which power consumption is small. Likewise, when there is a job execution history in the processing execution history information 320 after the return from the power-saving mode (YES in step S502), in step S507, the CPU unit 317 executes the power-saving mode shift processing to cause a shift to the power-saving mode. Then, the processing ends.

As described above, according to the present exemplary embodiment, when a human detection sensor unit 104 detects a departure of a user after execution of a job such as copying, a shift to the power-saving mode immediately occurs. Therefore, unnecessary power consumption can be suppressed as much as possible. In addition, when a departure of the user in a state in which the job has not been executed is detected, the normal mode is maintained for a predetermined time. Therefore, convenience of the user can be maintained.

According a second exemplary embodiment, a power-saving mode return (shift) sequence when any operation on an operation unit 319 after a return from the power-saving mode is detected will be described. It is to be noted that a configuration of an image forming apparatus 100 of the present exemplary embodiment is similar to the configuration in the first exemplary embodiment and therefore will not be described.

Figure 7:
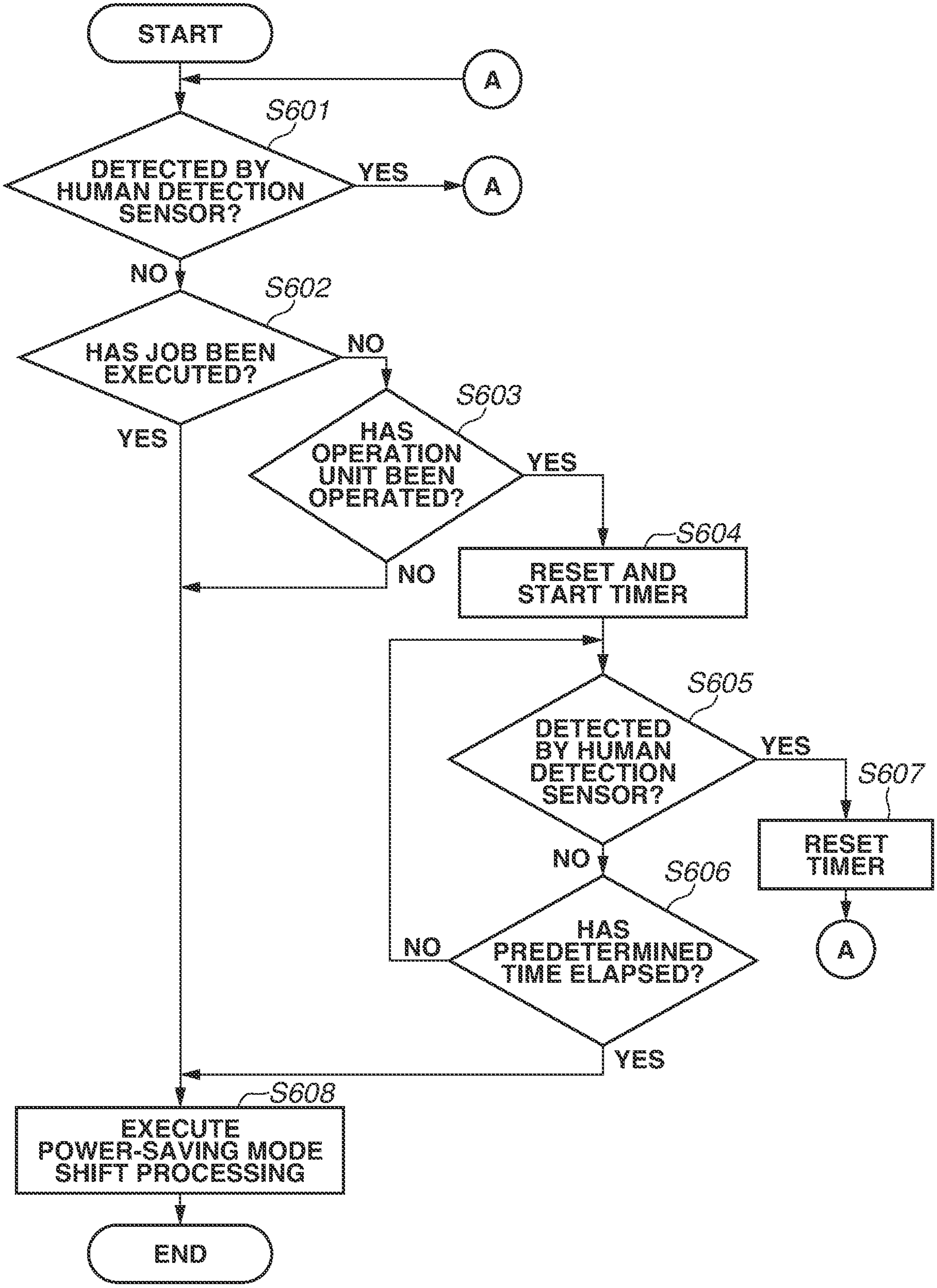
FIG. 7 is a flowchart illustrating a method for controlling the image forming apparatus.

FIG. 7 is a flowchart used to describe the method for controlling the image forming apparatus 100 according to the present exemplary embodiment. This is an example of the power-saving mode return (shift) sequence. It is to be noted that a non-illustrated sub CPU of the power-supply control unit 312 implements each step by loading the control program into the memory and executing the loaded control program.

In step S601, when the image forming apparatus 100 is in the normal mode after returning from the power-saving mode, the CPU unit 317 checks the state of the human detection sensor unit 104 through the power-supply control unit 312 to determine whether a human is present in front of the image forming apparatus 100. Upon determining that a human is present in front of the image forming apparatus 100 (YES in step S601), the CPU unit 317 regularly polls the human detection sensor unit 104, until the human detection sensor unit 104 enters a state of not detecting a human. In step S602, upon determining that no human is present in front of the image forming apparatus 100 (NO in step S601), the CPU unit 317 checks the processing execution history information 320 stored in the HDD unit 316. When there is no job execution history in the processing execution history information 320 after the return from the power-saving mode (NO in step S602), in step S603, the CPU unit 317 checks the operation history information 321 stored in the memory unit 315.

When there is an operation history in the operation history information 321 after the return from the power-saving mode (YES in step S603), the CPU unit 317 determines that the human is temporarily away from the image forming apparatus 100 (the image forming apparatus 100 is in use). Then, in step S604, the CPU unit 317 starts measurement of a predetermined time by activating the timer unit 314, after resetting the timer unit 314 and then setting the timer unit 314 at the time to be measured, so as to measure the predetermined time. In step S605, after activating the timer unit 314, the CPU unit 317 checks the state of the human detection sensor unit 104 through the power-supply control unit 312 to determine whether a human is present in front of the image forming apparatus 100 (or the human comes back).

In step S607, upon determining that the human is present in front of the image forming apparatus 100 (YES in step S605), the CPU unit 317 resets the timer unit 314 to cancel the measurement of the predetermined time. After resetting the timer unit 314, the CPU unit 317 regularly polls the human detection sensor unit 104, until the human detection sensor unit 104 enters a state of not detecting the human.

Upon determining that there is no human in front of the image forming apparatus 100 (NO in step S605), in step S606, the CPU unit 317 checks a timer count value of the timer unit 314. When the predetermined time has not elapsed (NO in step S606), the CPU unit 317 checks the state of the human detection sensor unit 104 again. When the predetermined time has elapsed (YES in step S606), in step S608, the CPU unit 317 executes the power-saving mode shift processing, to cause a shift to the power-saving mode in which power consumption is small.

Likewise, when there is a job execution history in the processing execution history information 320 after the return from the power-saving mode (YES in step S602), in step S608, the CPU unit 317 also executes the power-saving mode shift processing to cause a shift to the power-saving mode. Further, when there is no operation history in the operation history information 321 after the return from the power-saving mode (NO in step S603), the CPU unit 317 executes the power-saving mode shift processing as well to cause a shift to the power-saving mode.

As described above, according to the present exemplary embodiment, upon detection of a departure of a user in a state in which neither operation of the operation unit 319 nor execution of a job has been performed, a shift to the power-saving mode occurs immediately. Therefore, unnecessary power consumption can be suppressed as much as possible. In addition, when the human detection sensor unit 104 detects a departure of a user in a state in which the operation unit 319 has been operated but a job has not been executed, the normal mode is maintained for a predetermined time. Therefore, convenience of the user can be preserved.

Each step of the present embodiments can also be realized by executing software (a program) obtained through a network or any of various storage mediums in a processing device (a CPU, or a processor) such as a PC (a computer).

Embodiments of the present invention are not limited to the above-described exemplary embodiments, and various modifications (including any organic combination of exemplary embodiments) based on the spirit of the present invention are possible.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A processing apparatus comprising:

a first detection unit configured to detect a human;

an operation unit that is operated by an operator; and a second detection unit configured to detect whether the operation unit is operated, wherein power consumption of the processing apparatus increases based on the first detection unit detecting the human, and wherein, after the power consumption of the processing apparatus increases, in a case where an operation on the operation unit is not detected, the power consumption of the processing apparatus decreases before a lapse of a preset time, and in a case where the operation on the operation unit is detected, the power consumption of the processing apparatus decreases when the preset time lapses.

2. The processing apparatus according to claim 1, further comprising a timer unit configured to clock a time based on the operation unit being operated, wherein, after the power consumption of the processing apparatus increases based on the first detection unit detecting the human, the power consumption of the processing apparatus decreases based on the timer unit clocking the preset time.

3. The processing apparatus according to claim 1, wherein, after the power consumption of the processing apparatus increases based on the first detection unit detecting the human, in a case where the operation on the operation unit is detected within the preset time, the power consumption of the processing apparatus decreases when the preset time lapses without an action.

4. The processing apparatus according to claim 1, wherein the preset time is a time during which the operation is not performed.

5. The processing apparatus according to claim 1, wherein the power consumption of the processing apparatus increases based on the first detection unit detecting the human, at least due to increase of power supply to the operation unit, and wherein, after the power consumption of the processing apparatus increases, in a case where the operation on the operation unit is not detected, the power consumption of the processing apparatus decreases due to decrease of the power supply to the operation unit before the lapse of the preset time, and in a case where the operation on the operation unit is detected, the power consumption of the processing apparatus decreases due to decrease of the power supply to the operation unit when the preset time lapses.

6. The processing apparatus according to claim 1, wherein the first detection unit is a pyroelectric sensor.

7. The processing apparatus according to claim 1, wherein the first detection unit is an infrared-ray sensor configured to receive infrared rays.

8. The processing apparatus according to claim 1, wherein the first detection unit is an infrared-ray sensor configured to output infrared rays and receive infrared rays.

9. The processing apparatus according to claim 1, wherein the first detection unit is configured to detect movement of a human.

10. The processing apparatus according to claim 1, wherein the first detection unit is configured to detect presence of a human.

11. The processing apparatus according to claim 1, further comprising a printing unit configured to execute a printing operation in which an image is printed on a sheet.

12. The processing apparatus according to claim 1, further comprising a scanner unit configured to execute a scanning operation.

13. A control method for a processing apparatus comprising a first detection unit configured to detect a human, an operation unit that is operated by an operator, and a second detection unit configured to detect whether the operation unit is operated, the method comprising:

a first step in which power consumption of the processing apparatus increases based on the first detection unit detecting the human, a second step in which the power consumption of the processing apparatus decreases before a lapse of a preset time in a case where an operation on the operation unit is not detected after the first step, and, a third step in which the power consumption of the processing apparatus decreases when the preset time lapses in a case where the operation on the operation unit is detected after the first step.

14. The control method according to claim 13, wherein the processing apparatus further comprises a timer unit configured to clock a time based on the operation unit being operated, and wherein, in the third step, the power consumption of the processing apparatus decreases based on the timer unit clocking the preset time.

15. The control method according to claim 13, wherein, in the third step, the power consumption of the processing apparatus decreases when the preset time lapses without an action.

16. The control method according to claim 13, wherein the preset time is a time during which an operation is not performed.

17. The control method according to claim 13, wherein, in the second step, the power consumption of the processing apparatus decreases due to decrease of the power supply to the operation unit before the lapse of the preset time in a case where the operation on the operation unit is not detected, and wherein, in the third step, the power consumption of the processing apparatus decreases due to decrease of the power supply to the operation unit when the preset time lapses in a case where the operation on the operation unit is detected.

18. The control method according to claim 13, wherein the first detection unit is a pyroelectric sensor.

19. The control method according to claim 13, wherein the first detection unit is an infrared-ray sensor configured to receive infrared rays.

20. The control method according to claim 13, wherein the first detection unit is an infrared-ray sensor configured to output infrared rays and receive infrared rays.

21. The control method according to claim 13, wherein the first detection unit is configured to detect movement of a human.

22. The control method according to claim 13, wherein the first detection unit is configured to detect presence of a human.

23. The control method according to claim 13, wherein the processing apparatus further comprises a printing unit configured to execute a printing operation in which an image is printed on a sheet.

24. The control method according to claim 13, wherein the processing apparatus further comprises a scanner unit configured to execute a scanning operation.

25. The processing apparatus according to claim 1, wherein the first detection unit is a human sensor, and the human sensor is configured to detect a human contactles sly.

26. The control method according to claim 13, wherein the first detection unit is a human sensor, and the first step is a step in which the human sensor is configured to detect a human contactles sly.

27. A printing apparatus comprising:

a first detection unit configured to detect a human;

an operation unit that is operated by an operator; and a second detection unit configured to detect whether the operation unit is operated, wherein power consumption of the printing apparatus increases based on the first detection unit detecting the human, and wherein, after the power consumption of the printing apparatus increases, in a case where an operation on the operation unit is not detected, the power consumption of the printing apparatus decreases before a lapse of a preset time, and in a case where the operation on the operation unit is detected, the power consumption of the printing apparatus decreases when the preset time lapses.

28. The printing apparatus according to claim 27, further comprising a timer unit configured to clock a time based on the operation unit being operated, wherein, after the power consumption of the printing apparatus increases based on the first detection unit detecting the human, the power consumption of the printing apparatus decreases based on the timer unit clocking the preset time.

29. The printing apparatus according to claim 27, wherein, after the power consumption of the printing apparatus increases based on the first detection unit detecting the human, in a case where the operation on the operation unit is detected within the preset time, the power consumption of the printing apparatus decreases when the preset time lapses without an action.

30. The printing apparatus according to claim 27, wherein the preset time is a time during which the operation is not performed.

31. The printing apparatus according to claim 27, wherein the power consumption of the printing apparatus increases based on the first detection unit detecting the human, at least due to increase of power supply to the operation unit, and wherein, after the power consumption of the printing apparatus increases, in a case where the operation on the operation unit is not detected, the power consumption of the printing apparatus decreases due to decrease of the power supply to the operation unit before the lapse of the preset time, and in a case where the operation on the operation unit is detected, the power consumption of the printing apparatus decreases due to decrease of the power supply to the operation unit when the preset time lapses.

32. The printing apparatus according to claim 27, wherein the first detection unit is a pyroelectric sensor.

33. The printing apparatus according to claim 27, wherein the first detection unit is an infrared-ray sensor configured to receive infrared rays.

34. The printing apparatus according to claim 27, wherein the first detection unit is an infrared-ray sensor configured to output infrared rays and receive infrared rays.

35. The printing apparatus according to claim 27, wherein the first detection unit is configured to detect movement of a human.

36. The printing apparatus according to claim 27, wherein the first detection unit is configured to detect presence of a human.

37. The printing apparatus according to claim 27, further comprising a printing unit configured to execute a printing operation in which an image is printed on a sheet.

38. The printing apparatus according to claim 27, further comprising a scanner unit configured to execute a scanning operation.

39. The printing apparatus according to claim 27, wherein the first detection unit is a human sensor, and the human sensor is configured to detect a human contactlessly.

* * * * *